United States Patent
Dai

(10) Patent No.: US 9,688,575 B2
(45) Date of Patent: Jun. 27, 2017

(54) LOW PRESSURE AIR OR VACUUM GLASS EDGE-SEALED WITH BAR FRAME AND GROOVE

(71) Applicant: Changhong Dai, Qingdao (CN)

(72) Inventor: Changhong Dai, Qingdao (CN)

( * ) Notice: Subject to any disclaimer, the term of this patent is extended or adjusted under 35 U.S.C. 154(b) by 325 days.

(21) Appl. No.: 14/383,702

(22) PCT Filed: Mar. 21, 2013

(86) PCT No.: PCT/CN2013/072968
§ 371 (c)(1),
(2) Date: Sep. 8, 2014

(87) PCT Pub. No.: WO2013/139281
PCT Pub. Date: Sep. 26, 2013

(65) Prior Publication Data
US 2015/0024151 A1  Jan. 22, 2015

(30) Foreign Application Priority Data

Mar. 21, 2012 (CN) .......................... 2012 1 0075435
Mar. 21, 2012 (CN) .......................... 2012 1 0075601
(Continued)

(51) Int. Cl.
*E06B 3/66* (2006.01)
*C03C 27/10* (2006.01)
*E06B 3/663* (2006.01)

(52) U.S. Cl.
CPC ............ *C03C 27/10* (2013.01); *E06B 3/6612* (2013.01); *E06B 3/66304* (2013.01); *Y02B 80/24* (2013.01)

(58) Field of Classification Search
CPC ...... E06B 3/66; E06B 3/6612; E06B 3/66304; Y02B 80/24
See application file for complete search history.

(56) References Cited

U.S. PATENT DOCUMENTS 3,842,567 A     10/1974  Zwart et al.
6,105,336 A  *   8/2000  Katoh ...................... E06B 3/66
                                                             428/34
(Continued)

FOREIGN PATENT DOCUMENTS

CN    1676481 A    10/2005
CN    2740605 Y    11/2005
(Continued)

OTHER PUBLICATIONS

Liu, Shimin, WO2013139281, International Search Report, Jun. 1, 2013, State Intellectual Property Office of the P.R. China.
(Continued)

*Primary Examiner* — Donald J Loney
(74) *Attorney, Agent, or Firm* — Na Xu; IPro, PLLC

(57) ABSTRACT

A low pressure air or vacuum glass and manufacturing method thereof, the low pressure air or vacuum glass comprising upper glass and lower glass; the upper glass and the lower glass are flat glass or convex glass; the peripheries of the upper glass and the lower glass are provided with an edge sealing bar frame and/or an edge sealing groove, and are welded together via a low temperature glass solder, thus forming a closed low pressure air layer or vacuum layer therebetween. The low pressure or vacuum glass is of simple manufacturing process, low cost, high production efficiency, reliable sealing connection, and good sealing effect.

13 Claims, 4 Drawing Sheets

(30) Foreign Application Priority Data

Oct. 6, 2012 (CN) .......................... 2012 1 0374027
Oct. 6, 2012 (CN) .......................... 2012 1 0374043

(56) References Cited

U.S. PATENT DOCUMENTS

| | | | | |
|---|---|---|---|---|
| 6,436,493 | B1* | 8/2002 | Asano | E06B 3/6612 |
| | | | | 428/192 |
| 6,830,791 | B1* | 12/2004 | Misonou | B32B 17/10055 |
| | | | | 428/34 |
| 6,955,026 | B2* | 10/2005 | Misonou | E06B 3/66 |
| | | | | 428/34 |
| 2009/0324858 | A1 | 12/2009 | Jaeger | |
| 2010/0279038 | A1* | 11/2010 | Wang | E06B 3/66304 |
| | | | | 428/34 |

FOREIGN PATENT DOCUMENTS

| | | |
|---|---|---|
| CN | 1746119 | 3/2006 |
| CN | 101050056 | 10/2007 |
| CN | 201206116 Y | 3/2009 |
| CN | 101781085 A | 7/2010 |
| CN | 201521210 | 7/2010 |
| CN | 201620103 | 11/2010 |
| CN | 101973693 | 2/2011 |
| CN | 102040329 A | 5/2011 |
| CN | 102079631 | 6/2011 |
| CN | 201933018 U | 8/2011 |
| CN | 102951787 A | 3/2013 |
| CN | 102951813 A | 6/2013 |
| CN | 102951827 A | 6/2013 |
| CN | 103288337 | 9/2013 |
| CN | 102701575 A | 10/2013 |
| EP | 0999330 A1 | 10/2000 |
| GB | 2005402 | 4/1979 |
| WO | 87/03327 | 4/1987 |
| WO | 00/77336 | 12/2000 |
| WO | 01/02685 | 11/2001 |
| WO | WO0102685 A1 | 11/2001 |

OTHER PUBLICATIONS

Liu, Peng, CN201210374027.8, First office action, Sep. 23, 2016, State Intellectual Property Office of the P.R. China.
Liu, Peng, CN201210374027.8, First office action, Sep. 23, 2016, State Intellectual Property Office of the P. R. China.
Me, Wenjing, CN201210075601.X, First office action, Mar. 10, 2016, State Intellectual Property Office of the P. R. China.
Me, Wenjing, CN201210075601.X, Second office action, Oct. 23, 2016, State Intellectual Property Office of the P. R. China.
Zhu, Xiaoyan, CN201210075435.3, First office action, Mar. 25, 2014, State Intellectual Property Office of the P. R. China.
Zhu, Xiaoyan, CN201210075435.3, Second office action, Sep. 11, 2014, State Intellectual Property Office of the P. R. China.
Zhu Xiaoyan, CN201210075435.3, Third office action, Dec. 22, 2014, State Intellectual Property Office of the P. R. China.
Yang, Xu, CN201210374043.7, First office action, Aug. 31, 2016, State Intellectual Property Office of the P. R. China.
JP2015-500758, First office action, Nov. 24, 2015, Japanese Patent Office.
JP 2015-500758, Second office action, May 31, 2016, Japanese Patent Office.
A.A.Iynna, First office action, Jul. 7, 2016, Eurasian Patent Office.
Liu, Shimin, WO2013139281, Written Opinion of the International Searching Authority, Jul. 4, 2013, State Intellectual Property Office of the P. R. China.

* cited by examiner

LOW PRESSURE AIR OR VACUUM GLASS EDGE-SEALED WITH BAR FRAME AND GROOVE

This application is a national stage application of PCT application PCT/CN2013/072968 filed on Mar. 21, 2012, which is based on and claims priority to Chinese patent application 201210075601.X filed on Mar. 21, 2012, 201210075435.3 filed on Mar. 21, 2012, 201210374027.8 filed on Oct. 6, 2012, and 201210374043.7 filed on Oct. 6, 2012 in China. The entirety of each of the above-mentioned applications is hereby incorporated by reference herein in its entirety.

FIELD OF THE INVENTION

The invention relates to the production of a low pressure insulating glass or vacuum glass, and more particularly to a low pressure insulating glass or vacuum glass and a preparation method thereof.

BACKGROUND OF THE INVENTION

With increasing consciousness of environmental protection and energy saving, low pressure insulating glasses are widely used for the improvement of thermal and acoustic insulation of doors and windows. The effect of thermal insulation and acoustic insulation is determined by the thickness of the air layer between two flat glasses of the low pressure insulating glass. The thicker the air layer, the better the thermal and acoustic insulation effect. However, the increase of the thickness of the air layer results in high thickness of doors and windows, and thus increases the manufacturing costs. Other methods, such as film plating, film coating, and inert gas filling, are feasible in some extent, but also have high costs.

A typical low pressure insulating glass includes two or more pieces of glasses separated by a partition frame having a drier, and the peripheries of the two or more glasses are sealed by an organic sealant. The organic sealant itself has moisture, poor antiaging capacity, and weak airtightness, thereby affecting the service life of the low pressure insulating glass.

The air in the air layer is sealed between two glasses. When external temperature changes, the pressure of the air layer changes accordingly. When the external temperature rises, the pressure of the air layer is greater than atmospheric pressure, and the glasses of the low pressure insulating glass protrude outwards. When the external temperature falls, the pressure of the air layer is less than atmospheric pressure, and the glasses of the low pressure insulating glass depress inwards. The "breath" of the low pressure insulating glass shortens the service life thereof.

In general, existing methods for preparing vacuum glasses include sealing edges at high temperature, vacuumizing, and sealing the extraction opening. The vacuumizing and sealing the extraction opening are often carried out only on one glass.

The melting temperature of low temperature glass solders of conventional vacuum glass are generally greater than or equal to 400° C. Heating glass at this temperature for a long time will anneal the toughened glass. So, it is very difficult to produce toughened vacuum glass using conventional production technologies.

SUMMARY OF THE INVENTION

In view of the above-described problems existing in conventional insulating glasses, the present disclosure provides a low pressure insulating glass and a preparation method thereof. The method features a simple production process, low costs, high production efficiency, reliable and efficient sealing. The method can produce the low pressure insulating glass in batches with one-step process, is particularly suitable for production of toughened low pressure insulating glass. The prepared glass has good airtightness, long service life, high strength, and excellent thermal and acoustic insulation properties. The invention further provides a vacuum glass and a preparation method thereof. The method features simple production process, low costs, high production efficiency, reliable and efficient sealing. The method can produce the vacuum glass containing no extraction opening in batches with one-step process, is particularly suitable for production of toughened vacuum glass.

To solve the above problems, the present disclosure provides a low pressure insulating glass or a vacuum glass, comprising an upper glass and a lower glass; the upper glass is a flat glass or a convex glass, and the lower glass is a flat glass or a convex glass; an edge-sealing strip box and/or edge-sealing groove are disposed at peripheries of the upper and lower glasses; the peripheries of the upper and lower glasses are soldered using a low temperature solder; the low temperature solder is a low temperature glass solder; and a sealed low pressure air layer or vacuum layer is formed between the upper glass and the lower glass.

The sealed vacuum layer is formed between the upper glass and the lower glass, and the vacuum layer comprises one or two layers of supports.

The low pressure insulating glass or vacuum glass further comprises an intermediate glass which is disposed between the upper glass and the lower glass, and two sealed low pressure air layers or vacuum layers are formed between the upper glass and the intermediate glass, and between the lower glass and the intermediate glass, respectively.

At least one of the upper glass, the lower glass, and/or the intermediate glass is a toughened glass or semi-toughened glass.

The supports are prepared prior to or after the toughening of the glass.

A periphery of a soldering side of the upper glass comprises at least one edge-sealing strip box, and a periphery of a soldering side of the lower glass comprises at least one edge-sealing groove and two edge-sealing strip boxes.

The edge-sealing strip box is made of low temperature glass powder by means of printing or coating.

The edge-sealing groove is prepared by means of mechanical processing or laser processing.

The edge-sealing strip box and/or the supports are prepared by means of a soft mesh or hard mesh.

The edge-sealing strip box and/or the supports are mechanically processed after being cured.

The low pressure air layer is formed naturally at room temperature after edges of the glass are sealed at high temperature. The pressure in the air layer is 0.01-0.099 MPa, or 0.02-0.08 MPa.

The convex glass has an arch height of 0.1-200 mm.

The upper glass and the lower glass have the same arch height. Optionally, the arch height can be different as needed.

For the low pressure air layer, when the plane dimension of the upper and lower glasses is small or the arch height is large enough to resist the atmospheric pressure based on the convex shape and the strength of the glasses, the supports are not needed. When the upper and lower glasses cannot resist the atmospheric pressure based on the convex shape and the strength thereof, a small number of supports are needed to resist the atmospheric pressure together with the glass.

The supports are made of low-temperature glass, metal, ceramics, glass and/or plastic, preferably, low temperature glass powder or low temperature glass solder. The melting temperature of the low temperature glass powder is 550-750° C., and the melting temperature of the low temperature glass solder is 350-550° C.

The supports are printed on one glass or two glasses, and are column or strip in shape. When the supports are printed on one glass, they are columnar. When the supports are printed on two glasses, they present in strips and are stacked vertically.

The smallest unit of the supports is an equilateral triangle in lattice arrangement. The length of side of the equilateral triangle is around 50-500 mm, preferably, 100-300 mm. When the supports are strips, the length thereof is 0.3-5.0 mm, preferably, 0.5-2.0 mm, the width thereof is 0.1-2.0 mm, preferably, 0.2-1.0 mm, and the height thereof is 0.1-10.0 mm, preferably, 0.2-3.0 mm. The height of the supports can be 0-2.0 mm higher than that of the edge-sealing strip box, preferably, 0.1-0.5 mm. When the supports are columnar, the diameter thereof is 0.1-3.0 mm, preferably, 0.3-2.0 mm, and the height thereof is 0.1-5.0 mm, preferably, 0.2-3.0 mm; the height of the supports can be 0-0.3 mm higher than the actual height thereof after the upper and lower glasses are bonded, preferably, 0.1-0.2 mm.

When the strip supports are disposed both on the upper glass and on the lower glass, they are stacked vertically. In the process of melting, the upper glass and the lower glass are connected through the tops of the supports, which are point contact, while the connection of the supports and the glasses is line or surface contact.

The printing comprises stencil printing, screen printing or printer printing. The printing comprises hard screen (mesh) printing and soft screen (mesh) printing. The hard screen (mesh) is made of metal, and the soft screen (mesh) is made of organic materials.

The edge-sealing strip box comprises a plurality of vent holes. Specifically, a plurality of grooves or slots are evenly distributed along and are vertical to the edge-sealing strip box, the number of which is determined by the perimeter of the upper and lower glasses, the space between which is 50-500 mm. The vent holes are sealed along with the melting of the low temperature solder. Optionally, the vent holes can be absent, the gaps formed by the uneven surface of the coated low temperature solder or by powdery low temperature solder can function as the vent holes.

The periphery of the upper glass comprises at least one edge-sealing strip box. The periphery of the lower glass comprises at least one edge-sealing groove and two edge-sealing strip boxes, and the edge-sealing groove of the lower glass is disposed between the two edge-sealing strip boxes. The edge-sealing strip box of the upper glass is embedded into the edge-sealing groove of the lower glass.

The depth of the edge-sealing groove is 0.05-10 mm, preferably, 0.1-2 mm, and the width thereof is 0.3-10 mm, preferably, 2-6 mm.

A cross section of the edge-sealing groove is an arbitrary shape, particularly a circular arc; the edge-sealing groove is prepared by mechanical processing or laser processing, particularly by mechanical processing; the mechanical processing means fabricating the edge-sealing groove having arbitrary shape of cross section on the surface of a flat glass by mechanical grinding, mechanical cutting, or milling machine; and the laser processing means fabricating the edge-sealing groove having arbitrary shape of cross section on the surface of a flat glass by a laser gun, laser thinning machine, laser engraving machine.

The invention further provides a method for preparation of a low pressure insulating glass, comprising:

1) providing two pieces of flat glass having a dimension corresponding to a shape and size of a low pressure insulating glass to be prepared, disposing an edge-sealing groove on a soldering position at a periphery of a lower glass, and edging, chamfering, washing, and drying an upper glass and the lower glass;

2) printing or coating an edge-sealing strip box on the soldering position at the peripheries of the upper and lower glasses, the edge-sealing strip box on the upper glass being adapted to embed in edge-sealing groove of the lower glass; loading the upper and lower glasses in a mold, placing in a bending furnace or toughened furnace, heating the furnace to a glass transition temperature of between 550-750° C., where a downward convex surface is produced on the glass due to the self gravity thereof or by external force, cooling the furnace to room temperature or toughening the glass;

3) printing or coating a low temperature solder on the edge-sealing strip box and the edge-sealing groove, or directly loading the low temperature solder on the edge-sealing groove, vertically aligning and stacking the upper and lower glasses, an exhaust path being allowed between the two glasses, and transporting the two glasses to a high temperature edge-sealing furnace; and 4) heating the high temperature edge-sealing furnace to exceed a melting temperature of the low temperature solder, when the high temperature edge-sealing furnace comprises a local heating system, a basic heating system is first activated, followed by the local heating system; allowing the lower temperature solder to be melted into liquid, so that the edge-sealing strip boxes on the upper and lower glasses are bonded together due to the self gravity thereof; stopping heating, cooling the furnace, the two glasses being airtightly soldered by the low temperature solder, and opening the high temperature edge-sealing furnace to obtain a low pressure insulating glass.

The invention also provides a method of preparation of a vacuum glass, comprising:

1) providing two pieces of flat glass having a dimension corresponding to a shape and size of a vacuum glass to be prepared, disposing an edge-sealing groove on a soldering position at a periphery of a lower glass, and edging, chamfering, washing, and drying an upper glass and the lower glass;

2) preparing an edge-sealing strip boxes on the soldering position at the peripheries of the upper and lower glasses, the edge-sealing strip box on the upper glass being adapted to embed in edge-sealing groove of the lower glass; or, printing a support on at least one of the two glasses, drying, and transporting the glass to a high temperature furnace or a toughening furnace for high temperature treatment or toughening treatment;

3) printing or coating a low temperature solder on the edge-sealing strip box and the edge-sealing groove, or directly loading the low temperature solder on the edge-sealing groove, or printing the support on at least one of the two glasses, vertically aligning and stacking the upper and lower glasses, an extraction path being allowed between the two glasses, and transporting the two glasses to a vacuum edge-sealing furnace; and 4) vacuumizing and heating the vacuum edge-sealing furnace to a pressure of less than 0.1 Pa and a temperature of exceeding a melting temperature of the low temperature solder, when the vacuum edge-sealing furnace comprises a local heating system, a basic heating system is first activated, followed by the local heating system; allowing the lower temperature solder to be melted into liquid, so that the edge-sealing strip boxes on the upper glass is embedded into the edge-sealing groove of the lower glass due to the self gravity thereof; stopping heating, cooling the furnace, the two glasses being airtightly soldered by the low temperature solder, and opening the vacuum edge-sealing furnace to obtain a vacuum glass.

The high temperature edge-sealing furnace is a conventional heating furnace heated by an electric heating body, and comprises an intermittent furnace and a continuous furnace.

The high temperature edge-sealing furnace receives only one low pressure insulating glass each time, or simultaneously receives a plurality of low pressure insulating glasses; when a toughening glass is to be prepared, the high temperature edge-sealing furnace is provided with the basic heating system and the local heating system, the basic heating system adopts resistance heating or circulating hot air heating to heat the high temperature edge-sealing furnace and the glass to a basic temperature; thereafter, the local heating system locally heats the edge-sealing position at the periphery of the glass so that the low temperature solder is melted in a short time.

A basic heating temperature is between 280 and 320° C., and a local heating temperature is between 380 and 470° C.

A production process flow of the low temperature solder comprises: purchasing raw material—drying room—moisture measurement—receiving raw material—(screening)—raw material storage—dosing—blending—feeding—sintering—chilling—(drying room)—ball grinding—powder sieving—checking—packaging—delivery.

A production process flow of the low temperature solder is as follows: raw materials are purchased according to Table 3 in the specification, weighed in proportion, uniformly mixed in a clean vessel, packaged in batches, fed, and sintered by rapid heating. Specifically, oil having a pressure of 0.8-1.0 MPa is ignited, air pressure is gradually raised so that the oil is fully atomized and combusted; a load-free furnace is revolved and heated over 1100° C.; stop revolving and heating, and the raw materials are added (feeding under high temperature), the volatilization of active ingredient is prevented; a feeding cover is closed, the oil pressure and the air pressure are enhanced rapidly, the furnace is revolved again so as to heat the raw materials to 1220-1250° C. within approximately 2 hours, the temperature is maintained for 30-40 min, when a furnace lining is observed, the liquid is flat and has good fluidity, a resulting product is obtained.

A production process flow of the low temperature solder is as follows: a clean pool filled with cold water is disposed below the furnace; hot materials are put into the pool, and cold water is continuously added to the pool so that glass liquid is totally shattered and dispersed; the furnace is slightly heated to maintain the temperature of the liquid materials; the dispersed glass materials are collected from the cold water and are directly added to a ball mill; a ratio of materials, balls, and water is controlled at 1:(1.3-2.0):(0.8-1.2); the balls are alumina balls or natural flint, having a particle size of less than 37.5-50.0 mm, a length of 30-70 mm, a ratio of big balls to small balls is 3:8, a milling time is 22-24 hours. After wet milling, a resulting product is received by a plastic basin, allowed to stand for 12 hours, and then clean water is removed, block materials are dried and screened by a sieve of 53 or 80 μm, and stored in a plastic barrel.

A production process flow of the low temperature solder comprises: preparing low temperature glass powder, adding copper powder or aluminum powder and methyl cellulose to the glass powder, ball grinding the glass powder with low temperature glass, uniformly mixing, and granulating.

The low pressure air layer or the vacuum layer is formed naturally at room temperature after edges of the glass are sealed at high temperature. The pressure in the air layer is determined by the melting point of the low temperature solder, generally 0.01-0.099 MPa, preferably, 0.02-0.08 MPa.

The convex glass has an arch height more than or equal to 0.1 mm, particularly, 0.1-200 mm.

The low pressure insulating glass further comprises an intermediate glass which is a flat glass disposed between the upper glass and the lower glass, and two sealed low pressure air layers are formed between the upper glass and the intermediate glass, and between the lower glass and the intermediate glass.

The upper and lower convex glasses of the low pressure insulating glass have an arch height of 0.1-200 mm, particularly, 1-20 mm, preferably, being not protrude from the frame of doors and windows when using as doors and windows glasses.

The upper glass and the lower glass have the same arch height. Optionally, the arch height can be different as needed.

The arch height of the glass is determined by the shape, size, and functions of the glass. Upon already meeting the requirement for resisting the atmospheric pressure, the arch height is as small as possible, which, take door or window glass as an example, is 3-9 mm. Thus, there is a gap of 6-18 mm between two glasses, which is corresponding to conventional insulating glass and presents planar at atmospheric pressure, thereby bringing good visual effects and decreasing costs and space occupation.

Because the toughened and semi-toughened glasses have much higher strength, at the same shape and size, the arch height of the toughened or semi-toughened glass can be smaller, that is, the toughened or semi-toughened glass can be much flatter. The glasses are clamped between an upper mold and a lower mold and shaped by external force, and thus the convex glass has regular shape and is difficult to deform during toughening, thereby simplifying the edge sealing, and improving the sealing property and strength.

For the low pressure air layer, when the plane dimension of the upper and lower glasses is small or the arch height is large enough to resist the atmospheric pressure based on the convex shape and the strength of the glasses, the supports are not needed. When the upper and lower glasses cannot resist the atmospheric pressure based on the convex shape and the strength thereof, a small number of supports are needed to resist the atmospheric pressure together with the glass.

In the absence of the supports, the transparency, visibility, and the thermal and acoustic insulation properties of the glasses are better.

The supports are made of low-temperature glass, metal, ceramics, glass and/or plastic, preferably, low temperature glass powder or low temperature glass solder. The melting temperature of the low temperature glass powder is 550-750° C., and the melting temperature of the low temperature glass solder is 350-550° C.

The supports are printed on one glass or two glasses, preferably on two glasses.

The supports are column or strip in shape. When the supports are printed on one glass, they are preferably columnar. When the supports are printed on two glasses, they present in strips and are stacked vertically.

The smallest unit of the supports is an equilateral triangle in lattice arrangement. The length of side of the equilateral triangle is around 50-500 mm, preferably, 100-300 mm. When the supports are strips, the length thereof is 0.3-5.0 mm, preferably, 0.5-2.0 mm, the width thereof is 0.1-2.0 mm, preferably, 0.2-1.0 mm, and the height thereof is 0.1-10.0 mm, preferably, 0.2-3.0 mm. The height of the supports can be 0-2.0 mm higher than that of the edge-sealing strip box, preferably, 0.1-0.5 mm. When the supports are columnar, the diameter thereof is 0.1-3.0 mm, preferably, 0.3-2.0 mm, and the height thereof is 0.1-5.0 mm, preferably, 0.2-3.0 mm; the height of the supports can be 0-0.3 mm higher than the actual height after the upper and lower glasses are bound, preferably, 0.1-0.2 mm.

When the supports are disposed both on the upper glass and on the lower glass, they are stacked vertically for support. In the process of melting, the tops of the supports turn round, and the bottoms thereof turn wider. Thus, the upper glass and the lower glass are connected through the tops of the supports, which is point contact, while the connection of the supports and the glasses is line or surface contact, thereby increasing the contact area, reducing the tensile stress of the glass at the supports, saving the number of the supports, and further enhancing the transparency, thermal and acoustic insulation properties of the glasses.

The printing comprises stencil printing, screen printing or printer printing. The printing comprises hard screen (mesh) printing and soft screen (mesh) printing. The hard screen (mesh) is made of metal, and the soft screen (mesh) is made of organic materials.

The supports are printed prior to or after the bending of the glass. For the printing after the bending of the glass, hard screen (mesh) printing is preferable, which ensures the tops of the supports are in a plane, thereby eliminating the influence of the deformation of the glass on the planeness. For the printing after the bending of the glass, low temperature glass solder is preferable.

The edge-sealing strip box is made by printing or coating, preferably made of low temperature glass powder by means of screen printing. The glass power is preferably a glass glaze having a melting temperature of 550-750° C. The strip box can be prepared once or several times.

The printing comprises screen printing or stencil printing or printer printing. The low temperature glass powder is printed on the surface of the glass to form ribs.

The height of the edge-sealing strip box is 0.1-10 mm, preferably, 0.5-2 mm, and the width thereof is 0.2-5 mm, preferably, 1-2 mm.

The edge-sealing strip box comprises a plurality of vent holes. Specifically, a plurality of grooves or slots are evenly distributed along and vertical to the edge-sealing strip box, the number of which is determined by the perimeter of the upper and lower glasses, the space between which is 50-500 mm. The vent holes are sealed along with the melting of the low temperature solder. Optionally, the vent holes can be absent, the gaps formed by the uneven surface of the coated low temperature solder or by powdery low temperature solder can function as the vent holes. But, using grooves or slots as the vent holes can save the vent time.

The periphery of the upper glass comprises at least one edge-sealing strip box. The periphery of the lower glass comprises at least one edge-sealing groove and two edge-sealing strip boxes. The edge-sealing groove of the lower glass is disposed between the two edge-sealing strip boxes.

The edge-sealing strip box of the upper glass is embedded into the edge-sealing groove of the lower glass.

The depth of the edge-sealing groove is 0.05-10 mm, preferably, 0.1-2 mm, and the width thereof is 0.3-10 mm, preferably, 2-6 mm.

A cross section of the edge-sealing groove is an arbitrary shape, particularly a circular arc.

The edge-sealing groove is prepared by mechanical processing or laser processing, particularly by mechanical processing.

The mechanical processing means fabricating the edge-sealing groove having arbitrary shape of cross section on a surface of flat glass by mechanical grinding, mechanical cutting, or milling machine.

The laser processing means fabricating the edge-sealing groove having arbitrary shape of cross section on a surface of flat glass by a laser gun, laser thinning machine, laser engraving machine.

When the upper glass comprises more than one edge-sealing strip box, the lower glass comprises at least one edge-sealing groove. When the lower glass comprises at least two edge-sealing grooves, the edge-sealing strip box of the upper glass is embedded into corresponding edge-sealing groove of the lower glass, thereby sealing the low pressure insulating glass. When two low pressure layers exist, the edge-sealing groove on the upper surface of the intermediate glass is the same as that on the lower glass, and the edge-sealing strip box on the lower surface of the intermediate glass is the same as that on the upper glass.

The upper, lower, and intermediate glasses are common glass, toughened glass, semi-toughened glass, low-E glass, tempered glass (physically or chemically tempered), heat-reflective glass, wire glass, rolled glass, melt glass, or a combination thereof, preferably, toughened glass, semi-toughened glass, low-E glass, and more preferably, a combination of toughened glass or semi-toughened glass and low-E glass or semi-toughened glass, a combination of toughened glass or semi-toughened glass and low-E tempered glass, or a combination of toughened glass or semi-toughened glass and low-E glass.

The high temperature edge-sealing furnace is a conventional heating furnace heated by an electric heating body, and comprises an intermittent furnace and a continuous furnace.

The high temperature edge-sealing furnace receives only one low pressure insulating glass each time, or simultaneously receives a plurality of low pressure insulating glasses.

When a toughening glass is to be prepared, the high temperature edge-sealing furnace is provided with the basic heating system and the local heating system, the basic heating system adopts resistance heating, such as electric wire, electric tube, electric plate, or circulating hot air heating, to heat the high temperature edge-sealing furnace and the glass to a basic temperature; then, the local heating system, such as resistance heating, infrared heating, laser heating, induction heating, microwave heating, is utilized to locally heat the edge-sealing position at the periphery of the glass so that the low temperature solder is melted in a short time.

A basic heating temperature is between 280 and 320° C., and a local heating temperature is between 380 and 470° C.

Because the high temperature edge-sealing furnace comprises a basic heating system and a local heating system, the edge of the glass can be rapidly heated to the soldering temperature. Long time of low basic temperature and short time of high local temperature will not anneal the toughened or semi-toughed glass, thereby ensuring the generation of the toughened or semi-toughened glass.

Advantages of the invention are summarized as follows:

The upper glass and the lower glass of the convex low pressure glass cannot be completely laminated, and the low pressure layer is formed between the two glasses, which is conducive to resisting the atmospheric pressure, and saves users from preparation and installation of the supports. Without the supports, the transparency and visibility properties are better. Without the supports, the thermal and acoustic insulation properties are better. The convex shape provides the glass with higher compression strength, bending strength, and wind resistance. The convex shape provides the low pressure layer with more space and low pressure for a long time, which prolongs the service life of the glass. Even without low pressure, properties of the low pressure insulating glass also superior to that of the ordinary insulating glass.

For the low pressure insulating glass, the upper glass comprises the edge-sealing strip box, the lower glass comprises the edge-sealing groove, and thus the sealing of the insulating glass is convenient and reliable. The embedment of the strip box and the groove ensures the sealing stability of the glass even if glass deformation occurs, increases the sealing area, sealing effect, and the sealing thickness, prolongs the service life of the glass, enhances the adhesive force and adhesive strength of sealing, and overcomes the uneven edge of the existing low pressure insulating glass. The edge-sealing strip box and the upper glass have higher binding strength than low temperature welding glass. The preparation method can be achieved by one step process, which prompts the industrial production of the low pressure insulating glass, greatly improves the production efficiency and percent of pass, and reduces the production costs of the glass. The edge-sealing strip box of the upper glass is embedded into the edge-sealing groove of the lower glass, which enables the thickness of the low pressure air layer to be as small as possible, thereby reducing the height and diameter of the supports, and improving the transparency, visibility, thermal insulation, acoustic insulation performance of the glass. The edge-sealing strip box of the upper glass is embedded into the edge-sealing groove of the lower glass, which can adapt the thickness changes of the supports actively, and actively eliminate the deformation of the upper and lower glasses under high temperature. The thickness of the low pressure air layer can be adjusted according to the height of the edge-sealing strip box and the depth of the edge-sealing groove. The edge-sealing strip box on the lower glass can reduce depth of the edge-sealing groove and prevent the overflow of the low temperature solder, thereby ensuring the reliable sealing and beautiful appearance. The conventional sealing between the glass and the solder is transformed into a novel sealing between the edge-sealing strip box and the low temperature solder, thereby improving the sealing effect. When a low-E insulating glass is to be prepared, the edge-sealing groove is disposed at the surface of the low-E film, which is conducive to eliminating the influence of the low-E film on soldering. Or, the edge-sealing groove is incidentally prepared when removing the low-E film at the soldering position, which simplifies the process. After the low temperature solder is melted, the upper and lower glasses bond automatically. The solder ensures the reliable sealing, simplifies the production process, improves the production rate, and reduce the production costs.

The introduction of the high temperature edge-sealing furnace simplifies the production process, reduces the production costs, shortens the production cycle, and improves the production rate, so that the low pressure insulating glass, particularly toughened or semi-toughened glass can be produced using one step process in batches.

The toughened or semi-toughened insulating glass produced by the method has good sealing, high percent of pass, low costs, and competitive selling price.

For vacuum glass of the invention, the upper glass comprises the edge-sealing strip box, the lower glass comprises the edge-sealing groove, and thus the sealing of the vacuum glass is convenient and reliable. The embedment of the strip box and the groove ensures the sealing stability of the glass even if glass deformation occurs, increases the sealing area, sealing effect, and the sealing thickness, prolongs the service life of the glass, enhances the adhesive force and adhesive strength of sealing, and overcomes the uneven edge of the existing low pressure insulating glass. The edge-sealing strip box and the upper glass have higher binding strength than low temperature welding glass. The preparation method can be achieved by one step process, which prompts the industrial production of the vacuum glass, greatly improves the production efficiency and percent of pass, and reduces the production costs of the glass. The edge-sealing strip box of the upper glass is embedded into the edge-sealing groove of the lower glass, which enables the thickness of the vacuum layer to be as small as possible, thereby reducing the height and diameter of the supports, and improving the transparency, visibility, thermal insulation, acoustic insulation performance of the glass. The edge-sealing strip box of the upper glass is embedded into the edge-sealing groove of the lower glass, which can actively adapt the thickness changes of the supports, and actively eliminate the deformation of the upper and lower glasses under high temperature. The thickness of the vacuum layer can be adjusted according to the height of the edge-sealing strip box and the depth of the edge-sealing groove. The height of the edge-sealing strip box on the lower glass is about the height of the supporters. The edge-sealing strip box on the lower glass can reduce depth of the edge-sealing groove and prevent the overflow of the low temperature solder, thereby ensuring the reliable sealing and beautiful appearance. In the invention, the sealing between the glass and the solder in the prior art is transformed into a novel sealing between the edge-sealing strip box and the low temperature solder, thereby improving the sealing effect. When a low-E vacuum glass is to be prepared, the edge-sealing groove is disposed at the surface of the low-E film, which is conducive to eliminating the influence of the low-E film on soldering. Or, the edge-sealing groove is incidentally prepared when removing the low-E film at the soldering position, which simplifies the process. After the low temperature solder is melted, the upper and lower glasses bond automatically. The solder ensures the reliable sealing, simplifies the production process, improves the production rate, and reduce the production costs. And the getter is saved in the vacuum glass.

The introduction of the vacuum edge-sealing furnace saves the preparation and sealing of the extraction port and the extraction pipe, simplifies the production process, reduces the production costs, shortens the production cycle, and improves the production rate, so that the vacuum glass, particularly toughened or semi-toughened vacuum glass can be produced using one step process in batches.

The toughened or semi-toughened vacuum glass produced by the method has good sealing, high percent of pass, low costs, and competitive selling price.

BRIEF DESCRIPTION OF THE DRAWINGS

The invention is described herein below with reference to the accompanying drawings, in which.

Figure 1:
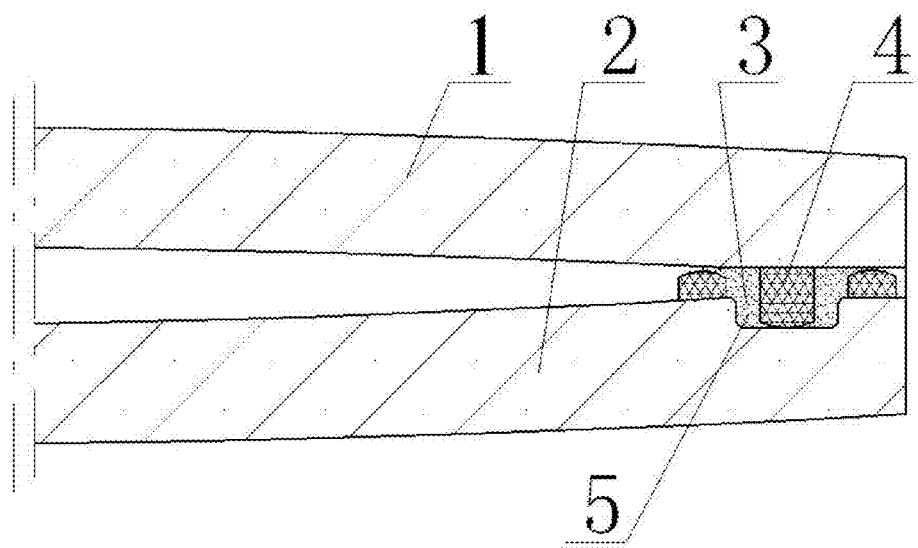
FIG. 1 is a schematic diagram of a low pressure insulating glass having a convex surface of the invention.

In the drawings, 1. Upper glass; 2. Lower glass; 3. Low temperature solder; 4. Edge-sealing strip box; 5. Edge-sealing groove; 6. Support; 7. Intermediate glass.

DETAILED DESCRIPTION OF THE EMBODIMENTS

For further illustrating the invention, experiments detailing a low pressure insulating glass or vacuum glass are described below. It should be noted that the following examples are intended to describe and not to limit the invention.

EXAMPLE 1

As shown in FIG. 1, a low pressure insulating glass comprises an upper glass and a lower glass, one of which is a low emissivity glass. The low pressure insulating glass is prepared as follows. First, a flat glass and a low emissivity glass having a dimension corresponding to a shape and size of a low pressure insulating glass to be prepared are prepared. An edge-sealing groove is disposed on a soldering position at the periphery of the lower glass. The upper and lower glasses are edged, chamfered, washed, and dried. Low temperature glass powder paste is printed on the upper and lower glasses to form edge-sealing strip boxes using a polyester mesh. With the bonding of the upper glass and the lower glass, the edge-sealing strip box of the upper glass is embedded into the edge-sealing groove of the lower glass. Second, the upper and lower glasses are loaded in a mold, transported to a bending furnace, and heated to a glass transition temperature of between 550-750° C., where a downward convex surface is produced on the glass due to the self gravity thereof. Thereafter, the furnace is cooled to room temperature. If the edge-sealing strip box deforms during the sintering, the deformation can be flattened using mechanical processing such as turning and grinding. Third, the low temperature solder is loaded on the edge-sealing groove of the lower glass, the upper and lower glasses are vertically aligned and stacked, an exhaust path is allowed between the two glasses, and the two glasses are transported to a high temperature edge-sealing furnace. The high temperature edge-sealing furnace is heated to exceed a melting temperature of the low temperature solder, for example, 420° C., so that the lower temperature solder is melted. The edge-sealing strip boxes on the upper glass are embedded into the edge-sealing groove of the lower glass due to the self gravity thereof, so that the two glasses are bonded by the melted solder. Thereafter, the furnace is cooled to room temperature, and the two glasses are airtightly soldered by the low temperature solder. The high temperature edge-sealing furnace is opened and a low pressure insulating glass is obtained.

The edge-sealing strip box and the edge-sealing groove cooperate to limit the irregular flow of the melted solder, and support the two glasses to allow the low temperature solder to keep a desired thickness thereby strengthening the sealing effect. The edge-sealing strip box and the edge-sealing groove are heated at high temperature thereby easily bonding with the upper glass, and the surfaces thereof are rough thereby firmly bonding with the solder, both of which enhance the air tightness and stability of the low pressure insulating glass. In addition, the edge-sealing strip box is a key element for one-step preparation of the low pressure insulating glass.

The mechanical process of the sintered edge-sealing strip box can solve the deformations of shape and size resulting from the sintering.

EXAMPLE 2

Figure 2:
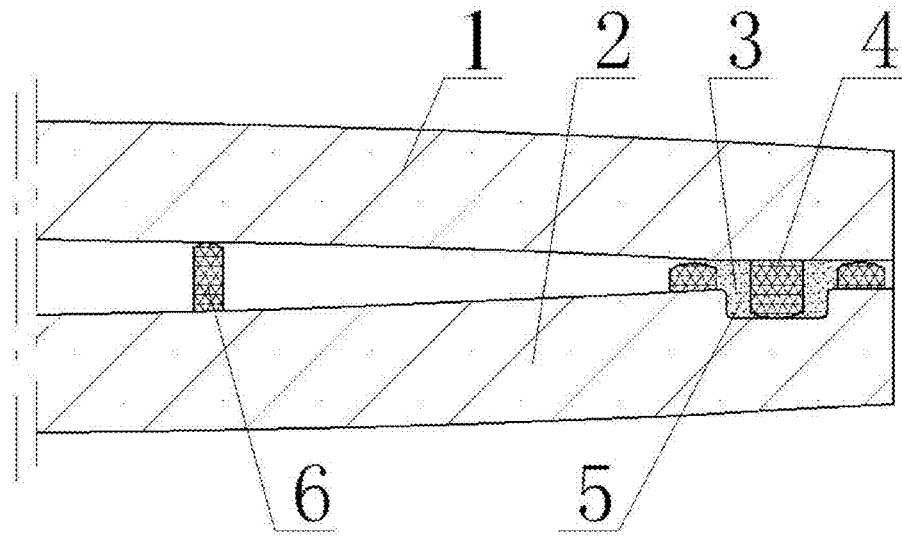
FIG. 2 is a schematic diagram of a low pressure insulating glass having a convex surface and one layer of supports of the invention.

As shown in FIG. 2, a low pressure insulating glass comprises an upper glass and a lower glass, one of which is a low emissivity glass, and the other is a toughened glass or semi-toughened glass. The low pressure insulating glass is prepared as follows. First, a flat glass and a low emissivity glass having a dimension corresponding to a shape and size of a low pressure insulating glass to be prepared are prepared. An edge-sealing groove is disposed on a soldering position at the periphery of the lower glass. The upper and lower glasses are edged, chamfered, washed, and dried. Low temperature glass powder paste is printed on the upper and lower glasses to form edge-sealing strip boxes using a spray gun. With the bonding of the upper glass and the lower glass, the edge-sealing strip box of the upper glass is embedded into the edge-sealing groove of the lower glass. Second, the upper glass is loaded in a mold, transported to a bending furnace, and heated to a glass transition temperature of between 550-750° C., where a downward convex surface is produced on the glass due to the self gravity thereof. Thereafter, the furnace is naturally cooled to room temperature or suddenly cooled for the strengthening of the glass, to obtain the upper glass having the edge-sealing strip box. The lower glass is loaded on a mold, transported to a toughening furnace, and heated to 650-750° C. for softening. External force is exerted on the upper mold to enable the glass to generate a downward convex surface. The glass is air-cooled, toughened to yield a toughened or semi-toughened glass. The low temperature glass solder is printed on the upper or lower glass using tensioned steel mesh or steel screen to fabricate supports. The tops of the supports are in one plane whereby eliminating the influence of the deformation of the glass on the flatness. The supports are circular or oval in lattice arrangement and correspond to the convex surface. The supports are prepared for several times to adapt to the space alteration of the convex surface. The supports are columnar and the height thereof is slightly higher than the height of the low pressure air layer. The low temperature solder is coated on the edge-sealing groove of the upper glass, and a plurality of vent holes are evenly left on the solder. The upper and lower glasses are vertically aligned and stacked, and transported to a high temperature edge-sealing furnace comprising a basic heating system and a local heating system. The glasses are first heated by the basic heating system such as electric heating wire to exceed 300° C., and then the solder is heated by the local heating system such as infrared heater to exceed the melting temperature of 450° C. The vent holes disappear, and the two glasses are bonded by the melted glass solder. Thereafter, the furnace is cooled to room temperature, and the two glasses, along with the supports, are airtightly soldered by the low temperature solder. The high temperature edge-sealing furnace is opened and a low pressure insulating glass is obtained.

The supports of the glass solder making with low temperature solder can be softened and cured in the process of edge sealing. When printed on the upper glass, the supports can actively adapt to the height alteration of the low pressure air layer, thereby ensuring the bonding of the upper and lower glass. When printed on the lower glass, the supports are slightly higher than the air layer and can be softened during edge sealing, thereby ensuring the bonding and supporting of the upper and lower glass. The supports are printed by the hard mesh (screen), which can level the deformed glass and thereby ensuring the supporting reliability.

The low temperature glass powder used for preparation of the edge-sealing strip box has much higher melting temperature than the low temperature solder used for preparation of edge sealing, the former is cheap, has good properties and better bonding strength with the glass. The embedment of the edge-sealing strip box and the edge-sealing groove reduces the measure of the edge-sealing low temperature solder, lower the requirements to edge-sealing low temperature solder, increases the thickness of the airtight layer, and improves the bonding strength of the upper and lower glass. More importantly, the invention solves the sealing of deformation resulting from the hot bending of glass, thereby improving the percent of pass of the products.

The high temperature edge-sealing furnace comprises the basic heating system and the local heating system, so that the edges of the glass can be rapidly heated to the soldering temperature. Long time of low basic temperature and short time of high local temperature will not anneal the toughened or semi-toughed glass, thereby ensuring the generation of the toughened or semi-toughened glass.

EXAMPLE 3

Figure 3:
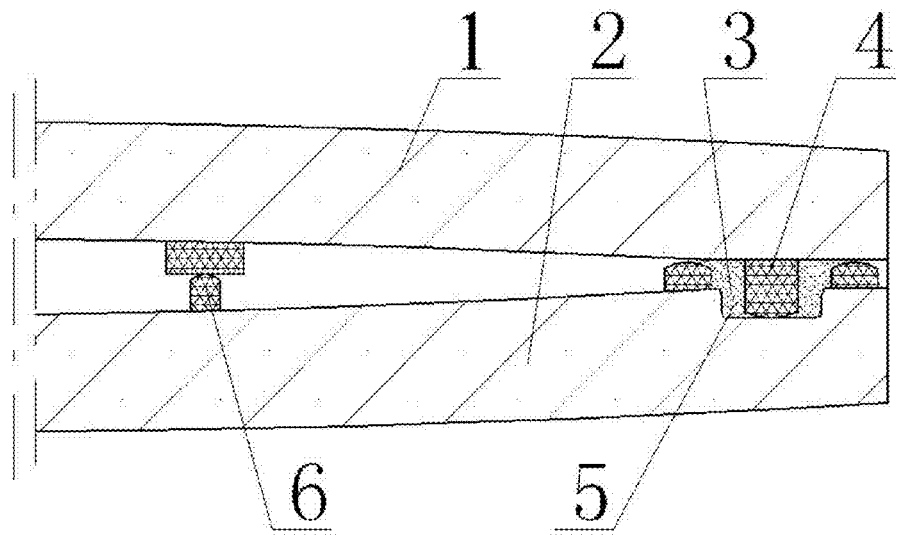
FIG. 3 is a schematic diagram of a low pressure insulating glass having a convex surface and two layers of supports of the invention.

As shown in FIG. 3, a low pressure insulating glass comprises an upper glass and a lower glass both being toughened glass or semi-toughened glass, one of which is a low emissivity glass. The low pressure insulating glass is prepared as follows. First, a flat glass and a low emissivity glass having a dimension corresponding to a shape and size of a low pressure insulating glass to be prepared are prepared. An edge-sealing groove is disposed on a soldering position at the periphery of the lower glass. The upper and lower glasses are edged, chamfered, washed, and dried. Low temperature glass powder paste is printed on the upper and lower glasses to form edge-sealing strip boxes using a nylon filament screen. With the bonding of the upper glass and the lower glass, the edge-sealing strip box of the upper glass is embedded into the edge-sealing groove of the lower glass. Second, the upper and lower glasses are loaded in two molds, respectively. Each mold comprises an upper mold and a lower mold, and the glass is clamped there between. The mold loaded with the glass is transported to a toughening furnace, and heated to a glass transition temperature. External force is exerted on the mold to enable the glass therein to produce a downward convex surface. Thereafter, the mold is removed, and the glass is air-cooled, toughened to yield a toughened or semi-toughened glass. The low temperature glass solder is printed on the upper or lower glass using tensioned steel mesh or steel screen to fabricate supports. The tops of the supports are in one plane whereby eliminating the influence of the deformation of the glass on the flatness. The smallest unit of the supports is an equilateral triangle in lattice arrangement. The supports are long strips. The supports on the upper glass and on the lower glass are mutually vertical. Thus, when the two glasses are bonded, the supports of the upper glass and the lower glass are stacked in crisscross. The low temperature solder is coated on the edge-sealing groove and between the edge-sealing strip boxes of the upper glass, and a plurality of vent holes are evenly left on the solder. The upper and lower glasses are vertically aligned and stacked, and transported to a high temperature edge-sealing furnace comprising a basic heating system and a local heating system. The glasses are first heated by the basic heating system such as electric heating pipe to exceed 320° C., and then the solder is heated by the local heating system such as far-infrared heater to exceed the melting temperature of 430° C. The vent holes disappear, the two glasses are bonded by the melted glass solder, and the supports are stacked in crisscross. Thereafter, the furnace is cooled to room temperature, and the two glasses, along with the supports, are airtightly soldered by the low temperature solder. The high temperature edge-sealing furnace is opened and a low pressure insulating glass is obtained.

Both the upper glass and the lower glass comprise strip supports which are stacked in crisscross. The upper glass and the lower glass are connected through the tops of the supports, which is point contact, while the connection of the supports and the glasses is line or surface contact, thereby increasing the contact area, reducing the tensile stress of the glass at the supports, saving the number of the supports, and further enhancing the transparency, thermal and acoustic insulation properties of the glasses.

Two layers of supports increase the height of the air layer, and can level the flatness of the two glasses, which is conducive to obtaining high flatness of glass.

EXAMPLE 4

Figure 4:
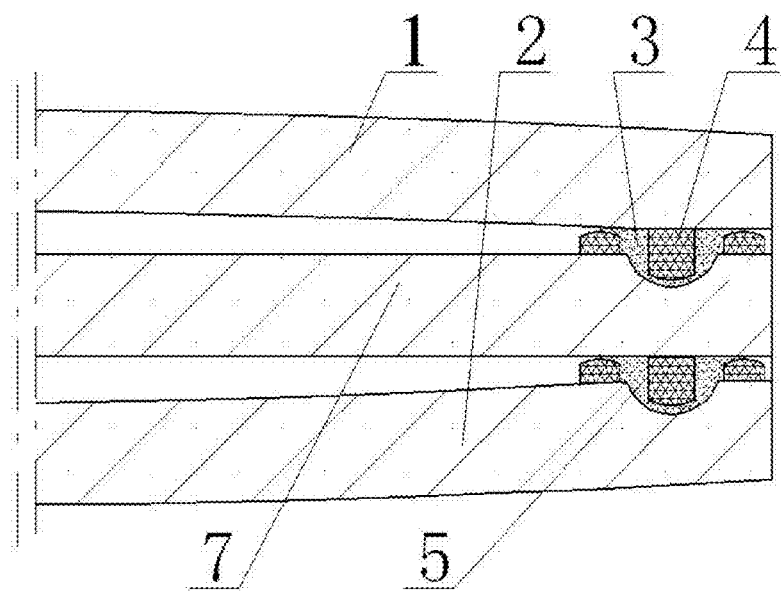
FIG. 4 is a schematic diagram of a low pressure insulating glass having a convex surface and two low pressure air layers of the invention.

As shown in FIG. 4, a low pressure insulating glass comprises an upper glass and a lower glass both being toughened glass or semi-toughened glass, and an intermediate glass being a low emissivity glass. The low pressure insulating glass is prepared as follows. First, two flat glasses and a low emissivity glass having a dimension corresponding to a shape and size of a low pressure insulating glass to be prepared are prepared. An edge-sealing groove is disposed on a soldering position at the periphery of the intermediate glass and the lower glass. The upper, intermediate, and lower glasses are edged, chamfered, washed, and dried. Low temperature glass powder paste is printed on the upper, intermediate, and lower glasses to form edge-sealing strip boxes using a spray gun. With the bonding of the upper, intermediate, and lower glass, the upper edge-sealing strip box is embedded into the lower edge-sealing groove. Second, the upper and lower glasses are loaded in two molds, respectively. Each mold comprises an upper mold and a lower mold, and the glass is clamped there between. The molds loaded with the glass are transported to a toughening furnace, and heated to a glass transition temperature. External force is exerted on the molds to enable the glass therein to produce a downward convex surface. Thereafter, the molds are removed, and the glass is air-cooled, toughened to yield a toughened or semi-toughened glass. The intermediate glass is directly placed in a high temperature furnace, where the edge-sealing strip box is sintered on the intermediate glass. The low temperature solder is coated on the edge-sealing groove of the intermediate and upper glasses. The three glasses are vertically aligned and stacked, a plurality of vent holes are evenly left on the solder, and transported to a high temperature edge-sealing furnace comprising a basic heating system and a local heating system. The glasses are first heated by the basic heating system such as electric heating pipe to exceed 320° C., and then the solder is heated by the local heating system such as far-infrared heater to exceed the melting temperature of 450° C. The three glasses are bonded by the melted glass solder. Thereafter, the furnace is cooled to room temperature, and the three glasses, along with the supports, are airtightly soldered by the low temperature solder. The high temperature edge-sealing furnace is opened and a low pressure insulating glass is obtained.

EXAMPLE 5

Figure 5:
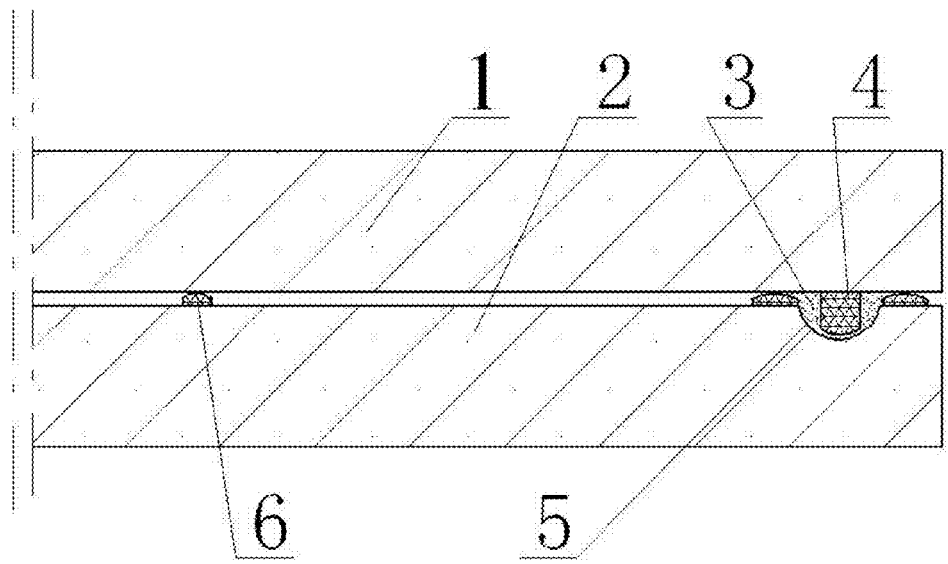
FIG. 5 is a schematic diagram of a vacuum glass of the invention.

As shown in FIG. 5, a vacuum glass comprises an upper glass and a lower glass, one of which is a low emissivity glass. The vacuum glass is prepared as follows. First, a flat glass and a low emissivity glass having a dimension corresponding to a shape and size of a vacuum glass to be prepared are prepared. An edge-sealing groove is disposed on a soldering position at the periphery of the lower glass. The upper and lower glasses are edged, chamfered, washed, and dried. Low temperature glass powder paste is printed on the upper and lower glasses to form edge-sealing strip boxes using polyester mesh, and further printed on the upper or lower glasses to form supports using polyester mesh. With the bonding of the upper glass and the lower glass, the edge-sealing strip box of the upper glass is embedded into the edge-sealing groove of the lower glass. Second, the upper and lower glasses are transported to a high temperature furnace, and heated to a glass transition temperature of between 550-650° C., where the edge-sealing strip box and the supports are softened or melted and bonded with the glasses. Thereafter, the furnace is cooled to room temperature. If the edge-sealing strip box or supports deform during the sintering, the deformation can be flattened using mechanical processing such as turning and grinding. Third, the low temperature solder is loaded on the edge-sealing groove and between the edge-sealing strip boxes of the lower glass, the upper and lower glasses are vertically aligned and stacked, an extraction path is allowed between the two glasses, and the two glasses are transported to a vacuum edge-sealing furnace. The edge-sealing furnace is heated to exceed a melting temperature of the low temperature solder, for example, 420° C., and vacuumized to less than 0.1 Pa, so that the lower temperature solder is melted. The edge-sealing strip boxes on the upper glass are embedded into the edge-sealing groove of the lower glass due to the self gravity thereof, so that the two glasses are bonded by the melted solder. Thereafter, the furnace is cooled to room temperature, and the two glasses are airtightly soldered by the low temperature solder. The vacuum edge-sealing furnace is opened and a vacuum glass is obtained.

The edge-sealing strip box and the edge-sealing groove cooperate to limit the irregular flow of the melted solder, and support the two glasses to allow the low temperature solder to keep a desired thickness thereby strengthening the sealing effect. The edge-sealing strip box and the edge-sealing groove are heated at high temperature thereby easily bonding with the upper glass, and the surfaces thereof are rough thereby firmly bonding with the solder, both of which enhance the airtightness and stability of the vacuum glass. In addition, the edge-sealing strip box is a key element for one-step preparation of the vacuum glass.

The mechanical process of the sintered edge-sealing strip box can solve the deformations of shape and size resulting from the sintering.

EXAMPLE 6

As shown in FIG. 5, a vacuum glass comprises an upper glass and a lower glass, both of which are float glass. The vacuum glass is prepared as follows. First, two flat glasses having a dimension corresponding to a shape and size of a vacuum glass to be prepared are prepared. An edge-sealing groove is disposed on a soldering position at the periphery of the lower glass. The upper and lower glasses are edged, chamfered, washed, and dried. Low temperature glass powder paste is printed on the upper and lower glasses to form edge-sealing strip boxes using printing technology. With the bonding of the upper glass and the lower glass, the edge-sealing strip box of the upper glass is embedded into the edge-sealing groove of the lower glass. Second, the upper and lower glasses are transported to a high temperature furnace, and heated to a temperature of between 550-650° C., where the edge-sealing strip box is bonded with the glasses. Thereafter, the furnace is cooled to room temperature, and the upper and lower glasses comprising the edge-sealing strip boxes are produced. Low temperature solder is printed on the upper glass to form supports. The smallest unit of the supports is an equilateral triangle in lattice arrangement. The supports are columnar. The low temperature glass solder is further coated in the edge-sealing groove of the lower glass. The upper and lower glasses are vertically aligned and stacked, an extraction path is allowed between the two glasses, and the two glasses are transported to a vacuum edge-sealing furnace. The edge-sealing furnace is heated to exceed a melting temperature of the low temperature solder, for example, 420° C., and vacuumized to less than 0.1 Pa, so that the lower temperature solder is melted. The edge-sealing strip boxes on the upper glass are embedded into the edge-sealing groove of the lower glass due to the self gravity thereof, so that the two glasses, together with the supports, are bonded by the melted solder. Thereafter, the furnace is cooled to room temperature, and the two glasses and the supports are airtightly soldered by the low temperature solder. The vacuum edge-sealing furnace is opened and a vacuum glass is obtained.

The supports of the glass solder can be softened and cured in the process of edge sealing. Printed on the upper glass, the supports can actively adapt to the height alteration of the vacuum layer, thereby ensuring the bonding of the upper and lower glass. The edge-sealing strip box and the edge-sealing groove can control the height of the vacuum layer, which prevents the complete closing of the upper and lower glass due to the softening of the supports.

EXAMPLE 7

As shown in FIG. 5, a vacuum glass comprises an upper glass and a lower glass, one of which is a low emissivity glass, and the other is a toughened glass or semi-toughened glass. The vacuum glass is prepared as follows. First, a flat glass and a low emissivity glass having a dimension corresponding to a shape and size of a vacuum glass to be prepared are prepared. An edge-sealing groove is disposed on a soldering position at the periphery of the lower glass. The upper and lower glasses are edged, chamfered, washed, and dried. Low temperature glass powder paste is printed on the upper and lower glasses to form edge-sealing strip boxes using a spray gun. With the bonding of the upper glass and the lower glass, the edge-sealing strip box of the upper glass is embedded into the edge-sealing groove of the lower glass. Second, the upper glass is transported to a toughening furnace, and heated to a temperature of between 650-750° C., where the edge-sealing strip box is bonded with the glass. Thereafter, the furnace is air cooled, toughened to yield a toughened or semi-toughened glass. The low temperature glass solder is printed on the upper or lower glass using tensioned steel mesh or steel screen to fabricate supports. The tops of the supports are in one plane whereby eliminating the influence of the deformation of the glass on the flatness. The smallest unit of the supports is an equilateral triangle in lattice arrangement. The supports are columnar. The lower glass is transported to a high temperature furnace, and heated to a temperature of between 550-650° C., where the edge-sealing strip box is bonded with the glasses. Thereafter, the furnace is cooled to room temperature, and the lower glass comprising the edge-sealing strip boxes is produced. The low temperature glass solder having a melting temperature of 380° C. is coated in the edge-sealing groove of the lower glass. The upper and lower glasses are vertically aligned and stacked, an extraction path is allowed between the two glasses, and the two glasses are transported to a vacuum edge-sealing furnace comprising a basic heating system and a local heating system. The edge-sealing furnace is first heated by the basic heating system such as electric heating plate to exceed 300° C., vacuumized to less than 0.1 Pa, and then heated by the local heating system such as electric heating pipe to exceed the melting temperature of 380° C. The low temperature solder is melted into liquid, and the edge-sealing strip boxes on the upper glass are embedded into the edge-sealing groove of the lower glass due to the self gravity thereof. The two glasses are bonded by the melted glass solder. Thereafter, the furnace is cooled to room temperature, and the two glasses, along with the supports, are airtightly soldered by the low temperature solder. The high temperature edge-sealing furnace is opened and a vacuum glass is obtained.

The low temperature glass powder used for preparation of the edge-sealing strip box has much higher melting temperature than the low temperature solder used for preparation of edge sealing, the former is cheap, has good properties and better bonding strength with the glass. The embedment of the edge-sealing strip box and the edge-sealing groove reduces the measure of the edge-sealing low temperature solder, lower the requirements to edge-sealing low temperature solder, increases the thickness of the airtight layer, and improves the bonding strength of the upper and lower glass. More importantly, the invention solves the sealing of deformation resulting from the hot bending of glass, thereby improving the percent of pass of the products.

The supports are printed by the hard mesh (screen), which can actively level the deformed glass. The supports of the glass solder can be softened and cured in the process of edge sealing. The supports are slightly higher than the air layer and can be softened during edge sealing, thereby ensuring the bonding of the upper and lower glass.

The high temperature edge-sealing furnace comprises the basic heating system and the local heating system, so that the edges of the glass can be rapidly heated to the soldering temperature. Long time of low basic temperature and short time of high local temperature will not anneal the toughened or semi-toughed glass, thereby ensuring the generation of the toughened or semi-toughened glass.

EXAMPLE 8

Figure 6:
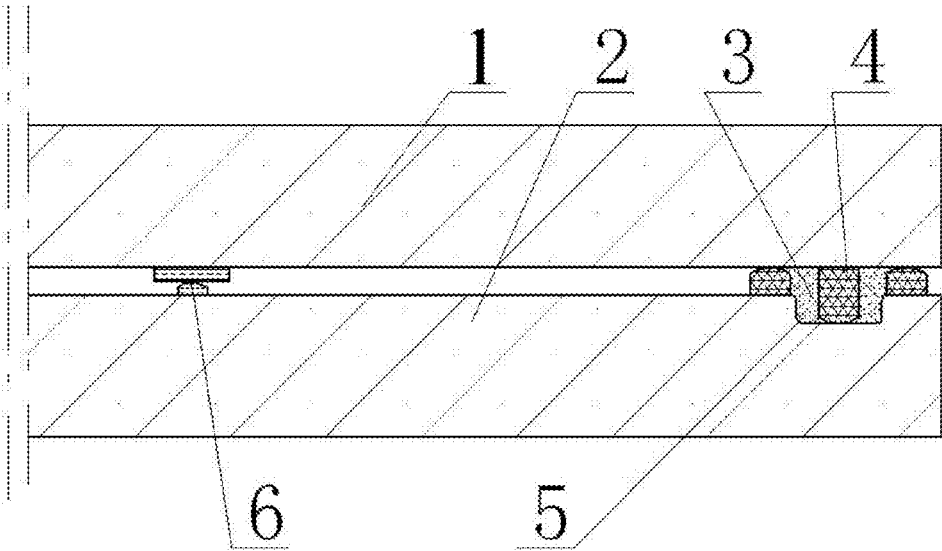
FIG. 6 is a schematic diagram of a toughened vacuum glass having two layers of supports of the invention.

As shown in FIG. 6, a vacuum glass comprises an upper glass and a lower glass both being toughened glass or semi-toughened glass, one of which is a low emissivity glass. The vacuum glass is prepared as follows. First, a flat glass and a low emissivity glass having a dimension corresponding to a shape and size of a vacuum glass to be prepared are prepared. An edge-sealing groove is disposed on a soldering position at the periphery of the lower glass. The upper and lower glasses are edged, chamfered, washed, and dried. Low temperature glass powder paste is printed on the upper and lower glasses to form edge-sealing strip boxes and supports using a nylon filament screen. With the bonding of the upper glass and the lower glass, the edge-sealing strip box of the upper glass is embedded into the edge-sealing groove of the lower glass. The smallest unit of the supports is an equilateral triangle in lattice arrangement. The supports are long strips. The supports on the upper glass and on the lower glass are mutually vertical. Thus, when the two glasses are bonded, the supports of the upper glass and the lower glass are stacked in crisscross. The two glasses are transported to a toughening furnace and heated so that the edge-sealing strip box, the supports, and the glasses are softened and bonded. Thereafter, the furnace is air cooled, toughened to yield a toughened or semi-toughened glass. To eliminate the height difference caused by the toughening of the glass, the edge-sealing strip box and the supports are mechanically processed to ensure the tops of the edge-sealing strip box and the supports are in a plane. The low temperature glass solder is coated in the edge-sealing groove of the lower glass. The upper and lower glasses are vertically aligned and stacked, an extraction path is allowed between the two glasses, and the two glasses are transported to a vacuum edge-sealing furnace comprising a basic heating system and a local heating system. The edge-sealing furnace is first heated by the basic heating system to exceed 320° C., vacuumized to less than 0.1 Pa, and then heated by the local heating system such as far-infrared heater to exceed the melting temperature of 430° C. The low temperature solder is melted into liquid, and the edge-sealing strip boxes on the upper glass are embedded into the edge-sealing groove of the lower glass due to the self gravity thereof. The two glasses are bonded by the melted glass solder. The supports on the upper and lower glasses are stacked in crisscross. Thereafter, the furnace is cooled to room temperature, and the two glasses, along with the supports, are airtightly soldered by the low temperature solder. The high temperature edge-sealing furnace is opened and a vacuum glass is obtained.

The strip supports are disposed both on the upper glass and on the lower glass, and they are stacked vertically. The upper glass and the lower glass are connected through the tops of the supports, which is point contact, while the connection of the supports and the glasses is line or surface contact, thereby increasing the contact area, reducing the tensile stress of the glass at the supports, saving the number of the supports, and further enhancing the transparency, thermal and acoustic insulation properties of the glasses. By mechanical treatment to the supports, the deformation effect of glass toughening is eliminated. The tops of the supports are in a plane to make sure the reliability of the support.

The two layers of supports provide large machining space, and can correct the flatness of the upper and lower glasses, thereby obtaining high flatness of glasses.

EXAMPLE 9

As shown in FIG. 6, a vacuum glass comprises an upper glass and a lower glass both being toughened glass or semi-toughened glass, one of which is a low emissivity glass. The vacuum glass is prepared as follows. First, a flat glass and a low emissivity glass having a dimension corresponding to a shape and size of a vacuum glass to be prepared are prepared. An edge-sealing groove is disposed on a soldering position at the periphery of the lower glass. The upper and lower glasses are edged, chamfered, washed, and dried. Low temperature glass powder paste is printed on the upper and lower glasses to form edge-sealing strip boxes and supports using a nylon filament screen. With the bonding of the upper glass and the lower glass, the edge-sealing strip box of the upper glass is embedded into the edge-sealing groove of the lower glass. To eliminate the unevenness of the edge-sealing strip box resulting from the deformation of the glass, the edge-sealing strip box is cut or ground to enable the tops of the edge-sealing strip box to be in a plane. The low temperature solder is printed on the upper and lower glass by steel mesh to yield supports. The smallest unit of the supports is an equilateral triangle in lattice arrangement. The supports are long strips and tops thereof are in a plane. The supports on the upper glass and on the lower glass are mutually vertical. Thus, when the two glasses are bonded, the supports of the upper glass and the lower glass are stacked in crisscross. The low temperature glass solder is coated in the edge-sealing groove of the lower glass. The upper and lower glasses are vertically aligned and stacked, an extraction path is allowed between the two glasses, and the two glasses are transported to a vacuum edge-sealing furnace comprising a basic heating system and a local heating system. The edge-sealing furnace is first heated by the basic heating system to exceed 330° C., vacuumized to less than 0.1 Pa, and then heated by the local heating system such as infrared heater to exceed the melting temperature of 430° C. The low temperature solder is melted into liquid, and the edge-sealing strip boxes on the upper glass are embedded into the edge-sealing groove of the lower glass due to the self gravity thereof. The two glasses are bonded by the melted glass solder. The supports on the upper and lower glasses are stacked in crisscross. Thereafter, the furnace is cooled to room temperature, and the two glasses, along with the supports, are airtightly soldered by the low temperature solder. The high temperature edge-sealing furnace is opened and a vacuum glass is obtained.

Initially, the edge-sealing strip box is as high as possible, which benefits a large scale of mechanical processing thereof after the toughening of the glass thereby ensuring the flatness of the glass.

The supports are made of low temperature glass solder and printed by the hard mesh (screen), which solves the deformation of the toughened glass. The supports of the glass solder can be softened and cured in the process of edge sealing. The supports are slightly higher than the air layer and can be softened during edge sealing, thereby ensuring the bonding of the upper and lower glass.

EXAMPLE 10

Figure 7:
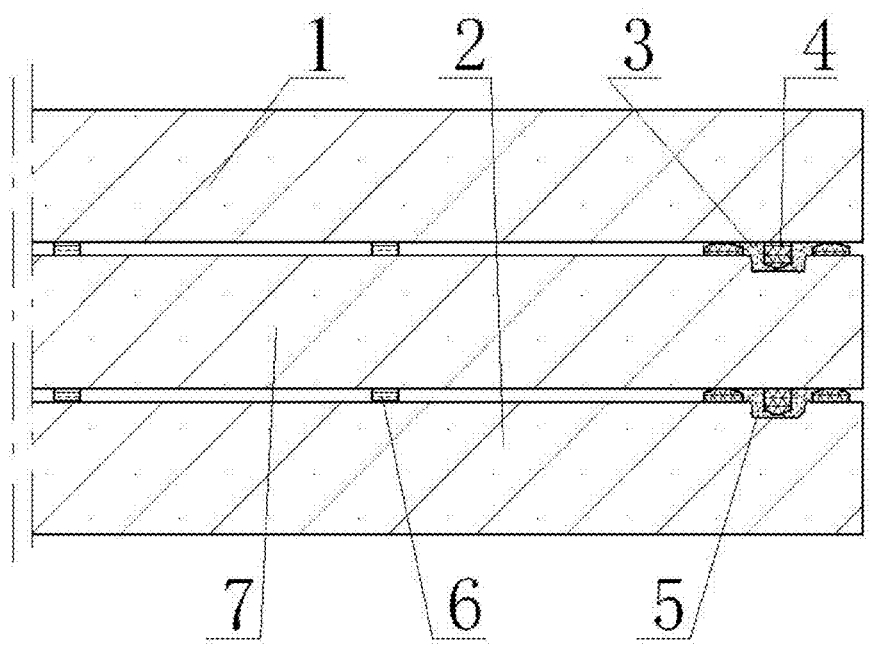
FIG. 7 is a schematic diagram of a toughened vacuum glass having two vacuum layers of the invention.

As shown in FIG. 7, a vacuum glass comprises an upper glass and a lower glass both being toughened glass or semi-toughened glass, and an intermediate glass being a low emissivity glass. The vacuum glass is prepared as follows. First, two flat glasses and a low emissivity glass having a dimension corresponding to a shape and size of a vacuum glass to be prepared are prepared. An edge-sealing groove is disposed on a soldering position at the periphery of the intermediate glass and the lower glass. The upper, intermediate, and lower glasses are edged, chamfered, washed, and dried. Low temperature glass powder paste is printed on the upper, intermediate, and lower glasses to form edge-sealing strip boxes using printing technology, and supports are printed on the upper and lower glasses. With the bonding of the upper, intermediate, and lower glasses, the upper edge-sealing strip boxes are embedded into the lower edge-sealing grooves. The upper and lower glasses are transported to a toughening furnace, where the edge-sealing strip box and the supports are bonded with the glass. Thus, a toughened or semi-toughened glass is obtained. The intermediate glass is directly placed in a high temperature furnace, where the edge-sealing strip box is sintered on the intermediate glass. The supports on the upper and lower glasses are mechanically processed, so as to diminish the height difference caused by the deformation of glasses in the process of toughening. Thereafter, the low temperature glass solder is coated on the supports using steel screen. The tops of the supports are in a plane whereby eliminating the influence of the deformation of the glass on the flatness. The low temperature glass solder is coated in the edge-sealing grooves of the intermediate and lower glasses. The three glasses are vertically aligned and stacked, an extraction path is allowed among the three glasses, and the glasses are transported to a vacuum edge-sealing furnace comprising a basic heating system and a local heating system. The edge-sealing furnace is first heated by the basic heating system such as circulating hot air to exceed 300° C., vacuumized to less than 0.1 Pa, and then heated by the local heating system such as infrared heater to exceed the melting temperature of 400° C. The edge-sealing strip boxes on the upper glass are embedded into the edge-sealing groove of the lower glass due to the self gravity thereof. The glasses are bonded by the melted glass solder. Thereafter, the furnace is cooled to room temperature, and the three glasses, along with the supports, are airtightly soldered by the low temperature solder. The high temperature edge-sealing furnace is opened and a vacuum glass is obtained.

The toughened supports are first mechanically processed, and then printed using a hard mesh, which can effectively solve the deformation of the toughened glass.

EXAMPLE 11

The chemical composition of the low temperature glass solder is listed in Table 1, and the properties thereof are listed in Table 2. To ensure the quality of the glass solder, the raw materials thereof are carefully selected and must be dried and have no lumps, as shown in Table 3. The equipment for preparing the low temperature glass powder involves six devices, among which the converter is a key one, as shown in Table 4.

TABLE 1

Chemical Composition

| Item | Low-temperature glass powder (%) |
|---|---|
| $Al_2O_3$ | 4.5-7.4 |
| $SiO_2$ | 56.6-62.0 |
| $Fe_2O_3$ | ≤0.02 |
| CaO | 4.5-6.5 |
| $Na_2O$ | 1.8-3.5 |
| $K_2O$ | 2.8-4.5 |
| $B_2O_3$ | 20.5-24 |
| Sb or Pb | 0 |
| Li (Lithium) | 0 |
| F (Francium) | 0 |

TABLE 2

Properties

| Item | Low-temperature glass powder |
|---|---|
| Density g/cm$^3$ | 2.30 ± 0.05 |
| Softening point ° C. ($10^{7.6}$P) | 640 ± 15.0 |
| Coefficient of thermal expansion, $1 * 10^{-7}$° C.$^{-1}$ (20-400)° C. | 52.0 ± 5.0 |
| Heat stability ° C. | ≥200.0 |
| Retained amount | see notes |
| Dielectric loss 6 MHz 20° C. tanδ | ≤6.5 |
| Volume resistivity Ωm (100° C.) | ≥1.90 |

TABLE 3

Raw materials

| Item | α-$Al_2O_3$ | $SiO_2$ | $H_3BO_3$ | $NaNO_3$ | $NaCO_3$ | $K_2CO_3$ | $CaCO_3$ | $Na_2SO_4$ |
|---|---|---|---|---|---|---|---|---|
| Essential component (%) | >98 | ≥98 | >96 | ≥98 | ≥98 | ≥96 | ≥95 | ≥98 |
| $SO_2$ (%) | | | <0.03 | | | | | |
| Ca (%) | | | <0.03 | | | | | |
| Cl (%) | | | | ≤1.2 | ≤0.5 | | | ≤0.7 |
| $Fe_2O_3$ (%) | <0.02 | ≤0.3 | | ≤0.02 | ≤0.02 | ≤0.1 | | ≤0.008 |
| Water-insoluble (%) | | | | | ≤0.2 | ≤0.1 | | ≤0.10 |
| $NaNO_2$ (%) | | | | ≤0.15 | | | | |
| $H_2O$ (%) | | | | ≤0.2 | | | | ≤0.5 |
| Ignition loss (%) | <0.80 | | | | ≤0.7 | ≤1.0 | | |
| HCl insoluble substance (%) | | | | | | | ≤0.5 | |
| Density (g/cm$^3$) | | 2.3-2.65 | 1.43-1.44 | 2.26-2.27 | 2.53 | 2.43 | 2.71 | 2.70 |
| Color | White powder | Light yellow | White powder or white piece | Clear crystal | White crystal | White crystal | Whiteness >85° | White crystal |
| Retained amount | | Less than 475 um | | More than 40 um and ≤10% | | | Less than 56 um | More than 80 um and ≤2% |
| Dosing (%) | 3 | 46-52 | 28-33 | 3 | 2-3 | 3-5 | 8 | 0.2-0.4 |

TABLE 4

Devices

| Name | Power of motor | Number | Technical requirements |
|---|---|---|---|
| Converter | 1.5 kW | 1 | Volume is 0.5 T, and rotating speed is 3-4 min/r; one end of the converter is used for heating, another end of the converter is configured with the vent, and the middle portion of the converter is used for charging the materials; furnace lining is made of medium and high grade aluminum. |
| Oil pump | 1.5 kW | 1 | Maximum pressure is 1.6 MPa, and fuel is No. zero diesels. |
| High pressure blower | 3.0 kW | 1 | Rotating speed is 2880 rpm, and maximum wind pressure is 10 MPa. |
| Sieving machine | 0.2 kw and 1.5 kw | 2 | Amplitude is 2.5 mm, and vibration frequency is 1440 r/min and 1960 r/min |
| Ball mill | 4.5 kW | 1 | Rotating speed is 40 rpm, and loading capacity is 500 kg. |
| Small drying room | | 1 | Volume is 30 m$^3$, and steam is heat source. |
| Others | | | Container, plastic barrel, stainless steel tools, and a plurality of weighing machines; production place is about 200 m$^2$. |

A production process flow of the low temperature solder comprises: purchasing raw material—drying room—moisture measurement—receiving raw material—(screening)—raw material storage—dosing—blending—feeding—sintering—chilling—(drying room)—ball grinding—powder sieving—checking—packaging—delivery.

The raw materials are purchased according to Table 3, weighed in proportion, uniformly mixed in a clean vessel (a mixer is preferable), packaged in batches for sintering (Storage should be dry).

Because the raw materials have different chemical decomposition temperature, the sintering must be rapid.

$$H_3BO_3 B_2O_3\uparrow +H_2O\uparrow (184\text{-}186° \text{ C. decomposition})$$

$$Na_2CO_3 Na_2O+CO_2\uparrow (750\text{-}800° \text{ C. decomposition})$$

$$CaCO_3 CaO+CO_2\uparrow (886\text{-}915° \text{ C. decomposition})$$

$$K_2CO_3 K_2O+CO_2\uparrow (890\text{-}895° \text{ C. decomposition})$$

Oil having a pressure of 0.8-1.0 MPa is ignited, air pressure is gradually raised so that the oil is fully atomized and combusted; a load-free furnace is revolved and heated to 1100° C.; stop revolving and heating, and the raw materials are added, the volatilization of active ingredient is prevented.

A feeding cover is closed, the oil pressure and the air pressure are enhanced rapidly, the furnace is revolved again so as to heat the raw materials to 1220-1250° C. within approximately 2 hours, the temperature is maintained for 30-40 min, when a furnace lining is observed, the liquid is flat and has good fluidity, a resulting product is obtained (the higher the temperature, the better, preferably 1300° C., and the more rapid the temperature rises, the better).

A clean pool filled with cold water is disposed below the furnace; hot materials are put into the pool (about 4 m³), and cold water is continuously added to the pool so that glass liquid is totally shattered and dispersed; the furnace is slightly heated to maintain the temperature of the liquid materials (the furnace can accommodate 400 kg of materials, and works continuously thereby saving energy and increasing the yield).

The dispersed glass materials are collected from the cold water and are directly added to a container box (with little holes under the box). For water milling, a ratio of materials, balls, and water is controlled at 1:(1.3-2.0):(0.8-1.2); the balls are alumina balls or natural flint, having a particle size of less than 37.5-50.0 mm, a length of 30-70 mm, a ratio of big balls to small balls is 3:8, a milling time is 22-24 hours; after wet milling, a resulting product is received by a plastic basin, allowed to stand for 12 hours, and then clean water is removed, block materials are dried and screened by a sieve of 53 or 80 Lm, and stored in a plastic barrel (stainless steel is preferable).

For dry milling, the glass materials are dried in a drying room and then put into a ball mill. The ratio of materials to balls is controlled at 1:(1.8-2.2). The ball mill is preferably sealed for dust prevention, and a stainless steel screen is disposed at the feeding inlet to stop the ball falling, the materials are rotary discharge.

Copper powder or aluminum powder and methyl cellulose is added to the low temperature glass powder, ball milled with low temperature glass, uniformly mixed, and granulated. The resulting product is used for the preparation of the low pressure insulating glass or vacuum glass of the invention. The low temperature solder of the invention has advantages of no crystallizing, good technological properties, and good effect.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A low pressure insulating glass or vacuum glass, comprising an upper glass and a lower glass, wherein the upper glass is a flat glass or a convex glass, and the lower glass is a flat glass or a convex glass; an edge-sealing strip is disposed at peripheries of the upper glass; edge-sealing strips and an edge-sealing groove disposed at a periphery of the lower glass, wherein the edge-sealing strip on the upper glass is adapted to embedded in the edge-sealing groove and between the edge-sealing strips on the lower glass, wherein lower temperature glass solder is located in the edge-sealing groove and between the edge-sealing strips on the lower glass; and a sealed low pressure air layer or vacuum layer is formed between the upper glass and the lower glass.

2. The low pressure insulating glass or vacuum glass of claim 1, wherein the low pressure air layer or vacuum layer comprises one or two layers of supports.

3. The low pressure insulating glass or vacuum glass of claim 1, further comprising: an intermediate glass disposed between the upper glass and the lower glass, wherein two sealed low pressure air layers or vacuum layers are formed between the upper glass and the intermediate glass, and between the lower glass and the intermediate glass, respectively.

4. The low pressure insulating glass or vacuum glass of claim 3, wherein, at least one of the upper glass and the lower glass is toughened glass or semi-toughened glass.

5. The low pressure insulating glass or vacuum glass of claim 4, wherein, the supports are prepared prior to or after the toughening of the upper and lower glasses.

6. The low pressure insulating glass or vacuum glass of claim 1, wherein, each the edge-sealing strip is made of low temperature glass powder by means of printing or coating.

7. The low pressure insulating glass or vacuum glass of claim 1, wherein, the edge-sealing groove is prepared by means of mechanical processing or laser processing.

8. The low pressure insulating glass or vacuum glass of claim 2, wherein, each the edge-sealing strip and/or the supports are prepared by means of soft mesh or hard mesh.

9. The low pressure insulating glass or vacuum glass of claim 2, wherein, each the edge-sealing strip and/or the supports are mechanically processed after being cured.

10. The low pressure insulating glass or vacuum glass of claim 7, wherein, each a cross section of the edge-sealing groove is an arbitrary shape, particularly a circular arc; the edge-sealing groove is prepared by mechanical processing; the mechanical processing means fabricating the edge-sealing groove having arbitrary shape of cross section on a surface of flat glass by mechanical grinding, mechanical cutting, or milling machine; and the laser processing means fabricating the edge-sealing groove having arbitrary shape of cross section on a surface of flat glass by a laser gun, laser thinning machine, laser engraving machine.

11. The low pressure insulating glass or vacuum glass of claim 3, wherein the upper glass has a convex bottom surface toward the lower glass, and the lower glass has a convex top surface toward the upper glass, and the intermediate glass has a flat top surface and a flat bottom surface different from the upper/lower glass.

12. The low pressure insulating glass or vacuum glass of claim 1, wherein the edge-sealing strip disposed at peripheries of the upper glass and the upper glass are integrally formed as a single piece.

13. The low pressure insulating glass or vacuum glass of claim 1, wherein the edge-sealing strips disposed at peripheries of the lower glass and the lower glass are integrally formed as a single piece.

* * * * *